US006297509B1

(12) United States Patent
Lipkowitsch et al.

(10) Patent No.: US 6,297,509 B1
(45) Date of Patent: Oct. 2, 2001

(54) DEVICE AND METHOD FOR DETECTING FLUORESCENT AND PHOSPHORESCENT LIGHT

(75) Inventors: Nikolai Lipkowitsch; Bernd Wunderer, both of Munich; Heinze-Philipp Hornung, Gilching, all of (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/319,246

(22) PCT Filed: Dec. 9, 1997

(86) PCT No.: PCT/EP97/06879

§ 371 Date: Aug. 9, 1999

§ 102(e) Date: Aug. 9, 1999

(87) PCT Pub. No.: WO98/26276

PCT Pub. Date: Jun. 18, 1998

(30) Foreign Application Priority Data

Dec. 9, 1996 (DE) ............................................ 196 51 101

(51) Int. Cl.[7] .................................................... G01N 21/64
(52) U.S. Cl. .................................... 250/461.1; 250/458.1
(58) Field of Search .............................. 250/461.1, 458.1

(56) References Cited

U.S. PATENT DOCUMENTS 3,180,988 4/1965 Burkhardt et al. .
3,473,027 10/1969 Freeman et al. .
3,592,326 7/1971 Zimmerle et al. .
3,904,872 9/1975 Ebukuro et al. .
4,650,320 3/1987 Chapman et al. .
5,252,834 * 10/1993 Lin .................................. 250/458.1
5,476,169 * 12/1995 Takarada et al. .................... 194/207
6,024,202 * 2/2000 Potter .................................. 194/207

FOREIGN PATENT DOCUMENTS

002097916-A * 11/1982 (GB) ............................ G01N/21/64
2 240 947 A 8/1991 (GB) .
06308032-A * 11/1994 (JP) .............................. G01N/21/64

* cited by examiner

*Primary Examiner*—Constantine Hannaher
(74) *Attorney, Agent, or Firm*—Bacon & Thomas, PLLC

(57) ABSTRACT

The apparatus has an illuminating device for illuminating sheet material with clocked excitation light. Both during the light phase of clocked excitation light and during the dark phase of clocked excitation light a sensor detects an intensity of the light emitted by the sheet material in each case. In an evaluation device an intensity of fluorescently emitted light and an intensity of phosphorescently emitted light are derived from the intensities detected in the light phase and in the dark phase of clocked excitation light. In order to ensure long preillumination with high intensity, the sensor preferably detects the intensities of emitted light within, and toward the end (in the transport direction) of, the area of the sheet material illuminated by the illuminating device. Additionally the illuminated area of the sheet material is selected to be so great that it is a multiple of the desired resolution.

26 Claims, 2 Drawing Sheets

DEVICE AND METHOD FOR DETECTING FLUORESCENT AND PHOSPHORESCENT LIGHT

Figures 1A, 1B, 1C, 1D:
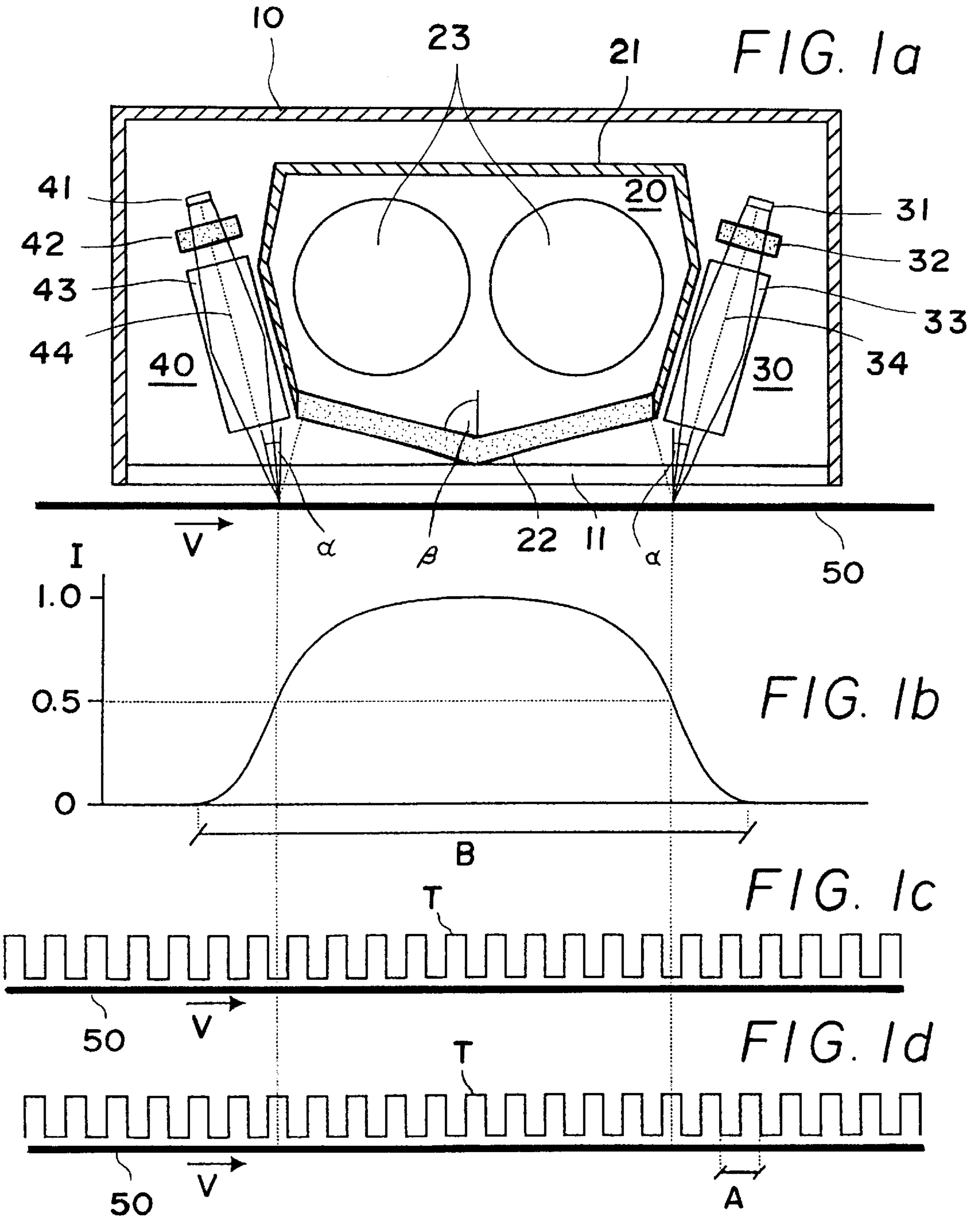

This invention describes an apparatus and method for detecting fluorescently and phosphorescently emitted light from sheet material such as papers of value or bank notes.

Such an apparatus is already known from U.S. Pat. No. 3,473,027. The apparatus described therein has an illuminating device for illuminating sheet material with ultraviolet excitation light. The sheet material is preferably illuminated continuously by ultraviolet excitation light. If required, clocked illumination of the sheet material is also possible. The light emitted by the sheet material is detected by a sensor. For this purpose the emitted light is imaged by a lens system onto a prism which then decomposes the emitted light into certain wave ranges. The individual wave ranges are each imaged by a further lens system onto a separate detector which then emits an electric signal proportional to the intensity of the wave range. To permit the sheet material to be detected along a track with a desired resolution, the sheet material is transported by a transport system along a transport direction past the illuminating device and sensor.

A disadvantage of the known apparatus is that the light emitted by the sheet material cannot be divided into fluorescent and phosphorescent fractions.

An apparatus and method for detecting fluorescently and phosphorescently emitted light from an identification mark on a parcel is known from U.S. Pat. No. 3,592,326. This print describes, in connection with a parcel singulating and orienting apparatus, an optical scanning means including an illuminating device wherein the parcels transported on conveyor belts are illuminated in clocked fashion during the transport motion by lamps focused on a scanning line. The light emitted by the parcel or identification mark is supplied via a rotating mirror assembly, whose rotary axis extends parallel to the transport direction and which is located exactly above said scanning line, via two prisms and associated filters to one of two sensors in each case. One sensor is in charge of detecting reflection and fluorescence when the illumination is switched on, and the other sensor for ascertaining phosphorescently emitted light when the illumination is switched off.

The known apparatus firstly has an elaborate structure and secondly requires at least two sensors, involving corresponding adjustment, calibration and servicing effort. Due to the illumination and scanning oriented toward the scanning line, the excitation of the phosphorescently glowing identification mark is low so that little intensity is available for detecting phosphorescently emitted light and no exact, reproducible measurement is ensured.

The invention is therefore based on the problem of providing a very exactly measuring apparatus and method for detecting fluorescent and phosphorescent light from sheet material wherein the light emitted by the sheet material can be divided into a fluorescent and a phosphorescent fraction with one common sensor.

This problem is solved by the features in the characterizing parts of the main claim and the independent claim.

According to the invention, the sensor detects one intensity of emitted light during the light phase of clocked excitation light and a further intensity of emitted light during the dark phase of clocked excitation light. In an evaluation device an intensity of fluorescently emitted light and an intensity of phosphorescently emitted light are derived from the intensities detected in the light phase and dark phase of clocked excitation light. The intensity of phosphorescently emitted light corresponds to the intensity of the dark phase, and the intensity of fluorescently emitted light is derived as the difference of intensity in the light phase and intensity in the dark phase. Furthermore, the sensor detects the intensities of emitted light within, and toward the end (in the transport direction) of, the area of the sheet material illuminated by the illuminating device. Additionally, the area of the sheet material illuminated by the illuminating device is selected to be so great that it is a multiple of the desired resolution.

This permits the intensity of phosphorescently emitted light to be relatively great since it ensures long preillumination with high intensity.

Figure 2:
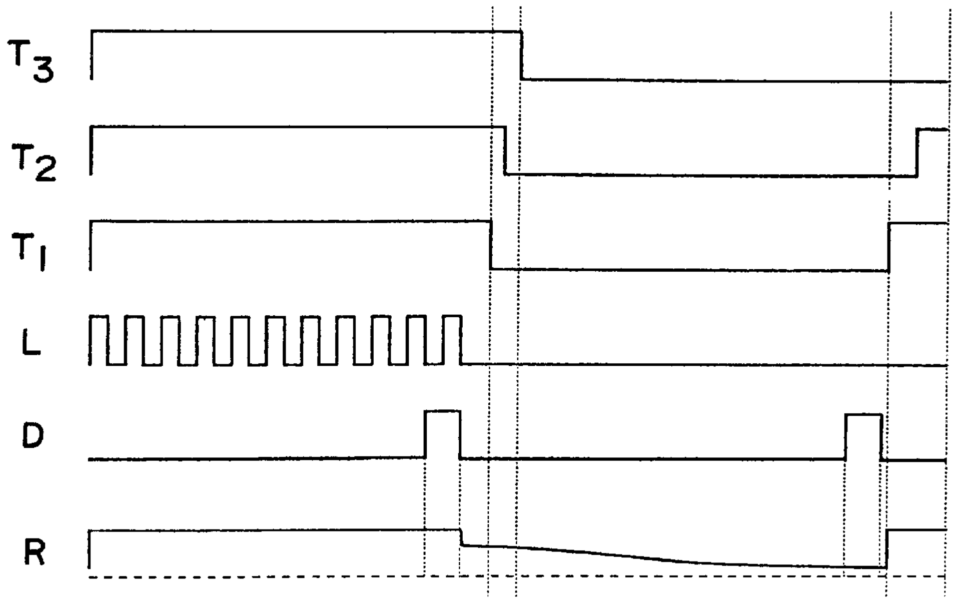

A preferred embodiment of the inventive apparatus and the carrying out of the inventive method will be explained in more detail in the following with reference to the figures, in which:

FIG. 1 shows a schematic diagram of the apparatus including the intensity of the illuminating device, FIG. 2 shows a schematic diagram of the clock relations, FIG. 3 shows intensity patterns of emitted light.

FIG. 1*a* shows a schematic diagram of a preferred embodiment of the inventive apparatus. In lightproof housing 10 with transparent window 11 there is illuminating device 20 and two sensors 30 and 40. Window 11 transmits both the wave range of the excitation light and the wave range of the fluorescently and phosphorescently emitted light.

Illuminating device 20 has lightproof housing 21 with filter 22 which does not transmit the wave range of the fluorescently and phosphorescently emitted light to be detected. In housing 21 there is excitation lamp 23 which is clocked suitably via a control device not shown here. The light emitted by excitation lamp 23 contains at least the wave range necessary for exciting fluorescently and phosphorescently emitted light.

As excitation lamp 23 one preferably uses a gas discharge lamp emitting at least UV light. In general one can also use as excitation lamp 23 a fluorescent lamp or gas discharge lamp without fluorescent substance. It is further possible to use gas discharge lamps emitting light due to a reaction of excited noble gases with halogen.

Sensors 30 and 40 are of substantially analogous construction. They preferably have detector array 31, 41 which convert light emitted by the sheet material into an electric signal proportional to the intensity of emitted light. As detector array 31, 41 one can use for example photodiode arrays or CCD arrays. If only one track on the sheet material is to be detected for example, detector array 3, 41 can also be replaced by a single detector. Detector array 31, 41 is preferably selected so that light emitted over the total width of the sheet material can be detected in contiguous tracks.

Further, sensors 30, 40 each have optical system 33, 43 for imaging an area of the sheet material which is preferably smaller than the desired resolution onto a detector of detector array 31, 41. As optical system 33, 43 one can use lens systems for example. However one preferably uses optical systems 33, 43 having at least one imaging unit of photoconductive material. The advantage of an imaging unit of photoconductive material is that it is of much more compact construction than lens systems.

Further, filter 32, 42 can be provided in optical axis 34, 44 of sensor 30, 40. Suitable choice of the wave ranges of filters 32, 42 will be dealt with below.

In order to ensure a compact structure of the apparatus, optical axes 34, 44 of sensors 30, 40 are rotated by angle $\alpha$ to a perpendicular to transport direction V. Undesirable reflections on window 11 are prevented by transparent window 11 being dereflected at least for light incident at angle α. Additionally, filter 22 consists of two legs each disposed at fixed angle β to a perpendicular to the transport direction. Angle β results as $\beta=90°-\alpha$.

Sheet material 50 is transported past illuminating device 20 and sensors 30 and 40 in a transport direction marked by an arrow and at given transport speed V by a transport system not shown here.

FIG. 1*b* shows the intensity of excitation light produced by the illuminating device in units relative to the spatial extent in the transport direction. In area B illuminated by the illuminating device the intensity of excitation light first rises to a maximum, then dropping again at the other end of the area. Sensors 30, 40 are disposed symmetrically to the maximum intensity of excitation light and detect the intensities of emitted light within illuminated area B. In the shown embodiment, sensors 30 and 40 detect the intensity of emitted light where the intensity of excitation light has dropped to half.

To permit the intensity detected by one of sensors 30, 40 to be assigned to a certain place in the transport direction on the sheet material, clock T is produced whose frequency results as the quotient of transport speed V of the transport system and desired local resolution A in the transport direction. It holds that T=V/A. For example for a transport speed of V=10 m/s and desired resolution A of 2 mm one obtains clock frequency T=5 kHz. The clock preferably has a logical 1 for half a pulse duration P=1/T and a logical 0 for the other half of the pulse duration.

FIGS. 1*c* and 1*d* show bank note 50 with clock T. The above definition of the clock frequency of clock T ensures that the logical 1 or logical 0 of clock T is each linked with a certain place on bank note 50 independently of transport speed V. Desired resolution A contains a period of clock T in each case For detecting fluorescently and phosphorescently emitted light from sheet material 50 one first illuminates it with clocked excitation light from illuminating device 20. The light emitted by sheet material 50 is detected by sensor 30 within illuminated area B toward the end (in the transport direction) of the illuminated area, preferably behind the maximum intensity of excitation light.

Since illuminated area B is much greater than desired resolution A, each area of resolution A is illuminated by excitation light from illuminating device 20 over several periods of clock T during transport of sheet material 50. Since the intensity of emitted light is detected by sensor 30 only toward the end (in the transport direction) of the illuminated area, preferably behind the maximum intensity of excitation light, it is ensured that each area A of sheet material 50 has relatively long preillumination with high intensity before the emitted light is detected by sensor 30. Long preillumination with high intensity causes initial intensity $I_O$ of a phosphorescently emitting substance to be relatively high. Since the intensity of emitted light from phosphorescent substances depends on initial intensity $I_O$ and drops exponentially with time, high initial intensity $I_O$ is necessary for exact measurement. The intensity of emitted light of a phosphorescent substance as a function of time meets the equation $I(t)=I_O/(1+(t/\tau)_\alpha)$. Decay time τ up to half the intensity and value α are properties of the phosphorescently emitting substance.

The time histories in the detection of emitted light are shown in FIG. 2. Clocks $T_1$ to $T_3$ are clocks at different transport speeds V and are determined by the above equation. The light phase and dark phase of clocked excitation light are produced with clock L. In the light phase excitation lamp 23 is clocked with certain, freely selectable clock L which has a higher frequency than clock T. At the beginning of a logical 1 of clock T clock L sends a certain number of logical 1s to the control unit of excitation lamp 23. At each logical 1 of clock L excitation lamp 23 produces a light pulse. In the light phase one thus has an excitation light having a certain number of light pulses emitted at the beginning of clock T. For the rest of clock T clock L provides a logical 0 and no excitation light is emitted by excitation lamp 23.

Intensity R of emitted light is thus approximately constant during the light phase and contains all wave ranges of the emitted light. Filter 32 is preferably provided in optical axis 34 of sensor 30 for transmitting only the wave range of fluorescently and phosphorescently emitted light.

In the dark phase beginning after the last light pulse of excitation light, only the intensity of phosphorescently emitted light is still present, dropping in accordance with the abovementioned power law depending on the selected substance.

Clock D controls the time of detection of emitted light by sensor 30. Clock D contains two areas with a logical 1. The first area controls detection of emitted light in the area of the light phase and the second area controls detection in the area of the dark phase. The time interval between the first area and the second area of clock D is selected to be constant. The time interval from the beginning of the first area of clock T to the beginning of clock D is also constant. The time areas of clock D and their position in the light or dark phase can fundamentally be selected at will. However the position and width of the first area of clock D are preferably selected so that the intensity of emitted light is measured in the light phase of a clock during the last light pulse. The position of the second area of clock D is laid so that the intensity of emitted light is measured in the dark phase after a constant time period after the last light pulse. The constant time period is selected so that detection of the intensity of emitted light in the dark phase takes place within shortest possible clock T.

Since clock T depends on transport speed V of the sheet material, as described above, it varies with a variation of transport speed V. Since the above-described method for detecting the intensity of emitted light in the light or dark phase depends only on the beginning of clock T, a slow-down of clock T, i.e. a slow-down of transport speed V, can be tolerated within certain limits. Since detection of emitted light in the dark phase is measured after a constant time period after the last light pulse, the reproducibility of the intensity of emitted light in the dark phase is also ensured despite the exponential drop in intensity of phosphorescently emitted light.

An intensity of fluorescently emitted light and an intensity of phosphorescently emitted light are derived from the intensities detected in the light phase and in the dark phase of clocked excitation light in each case. The intensity of phosphorescently emitted light can correspond to the intensity in the dark phase for example. The intensity of fluorescently emitted light can be derived as the difference of intensity in the light phase and intensity in the dark phase. It is of course also possible for the expert to use other arithmetical operations to derive the intensity of fluorescently or phosphorescently emitted light here.

Using second sensor 40 one can detect the light emitted by the sheet material in several different wave ranges. For this purpose, filter 42 is provided in sensor 40 in optical axis 44 for transmitting only a subrange of the wave range of fluorescently and phosphorescently emitted light. Since sensors 30, 40 are disposed symmetrically to the maximum intensity of illuminating device 20, sensor 40 detects the intensity of emitted light in the transport direction at the beginning of the illuminated area, preferably before the maximum intensity of excitation light. It follows that only negligibly small preillumination of the phosphorescent substance has taken place during detection of emitted light by sensor 40. Emitted light detected by sensor 40 in the dark phase can thus be substantially only undesirable stray light, so that the intensity of light detected in the dark phase by sensor 40 can be used for example to standardize all other measured intensities. Emitted light detected by sensor 40 during the light phase thus contains fluorescently emitted light which is restricted by filter 42 to a certain wave range.

During the light phase of excitation light, a total intensity of fluorescently emitted light can thus be derived from sensor 30 and an intensity of a certain wave range of fluorescently emitted light from sensor 40. By forming a difference of the detected total intensity of sensor 30 and the detected intensity of sensor 40 for example, one can also derive an intensity of fluorescently emitted light in the wave range complementary to the wave range of sensor 40.

During the dark phase, sensor 30 detects the intensity of phosphorescently emitted light. Via clock T the derived intensities can be assigned to a place with desired resolution A on bank note 50.

Figure 3A:
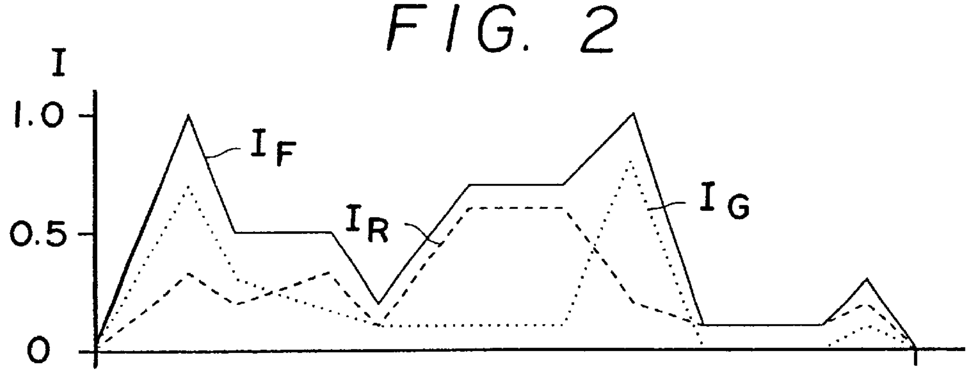
Figure 3B:
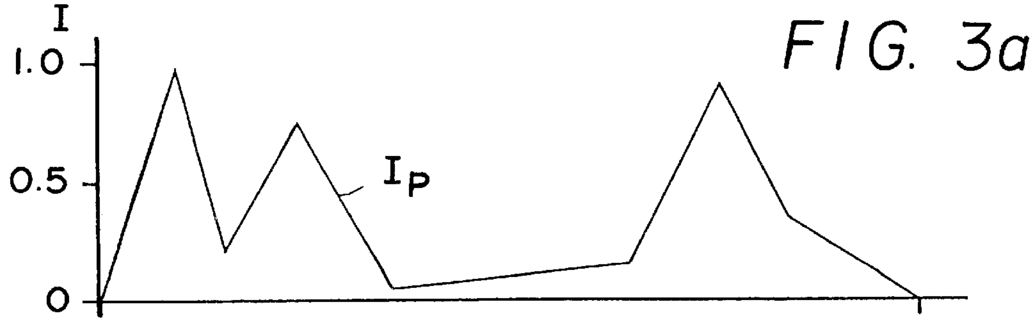

As a result of the method one obtains, as shown in FIG. 3*a*, an intensity pattern of emitted light resolved according to wave ranges for each sensor 30, 40 along each track over the total length of the sheet material. In the light phase sensor 30 detects intensity pattern $I_F$ containing the total wave range of emitted light. In the light phase sensor 40 detects intensity pattern $I_R$ containing only the red wave range of emitted light here for example. Intensity pattern $I_G$ of yellow-green emitted light results as the difference of intensity pattern $I_F$ and intensity pattern $I_R$. Further, one obtains intensity pattern $I_P$ for light emitted in the dark phase, which is shown in FIG. 3*b*. One then derives from the intensity patterns the intensities for phosphorescent light and fluorescent light in different wave ranges, as explained above.

As described above, by a suitable choice of tracks one can detect the light emitted fluorescently and phosphorescently by the total sheet material with a desired resolution.

What is claimed is:

1. An apparatus for detecting fluorescently and phosphorescently emitted light from sheet material such as papers of value or bank notes, comprising:

an illuminating device for illuminating the sheet material with clocked excitation light, at least one sensor for detecting light emitted by the sheet material, and a transport system for transporting the sheet material past the illuminating device and sensor in a transport direction, whereby the sensor detects an intensity of emitted light in the light phase of the clocked excitation light and an intensity in the dark phase thereof, an evaluation device is provided for deriving an intensity of fluorescently emitted light and an intensity of phosphorescently emitted light from the intensities detected in the light phase and the dark phase of the clocked excitation light, the area of the sheet material illuminated by the illuminating device is a multiple of a desired resolution, and the sensor detects the intensity of emitted light within, and toward the end (in the transport direction) of, the area of the sheet material illuminated by the illuminating device.

2. An apparatus according to claim 1, wherein the illuminating device has as an excitation lamp a gas discharge lamp emitting at least UV light.

3. An apparatus according to claim 1, wherein the illuminating device has as an excitation lamp a fluorescent lamp.

4. An apparatus according to claim 1, wherein the illuminating device has as an excitation lamp a gas discharge lamp without fluorescent substance.

5. An apparatus according to claim 1, wherein the illuminating device has as an excitation lamp a gas discharge lamp emitting excitation light due to a reaction of excited noble gases with halogens.

6. An apparatus according to claim 1, wherein the illuminating device has an excitation lamp located in a lightproof housing with a window with at least one filter which does not transmit the wave range of fluorescently and phosphorescently emitted light to be detected.

7. An apparatus according to claim 6, wherein the filters are disposed at a fixed angle to a perpendicular to the transport direction.

8. An apparatus according to claim 1, wherein the sensor has a detector array for detecting the intensity of emitted light.

9. An apparatus according to claim 8, wherein the sensor has an optical system for imaging an area of the sheet material smaller than a desired resolution onto a detector of the detector array.

10. An apparatus according to claim 9, wherein the optical system has at least one imaging unit of photoconductive material.

11. An apparatus according to claim 8, wherein the sensor has at least one filter which transmits only the wave range of fluorescently and phosphorescently emitted light.

12. An apparatus according to claim 1, wherein the optical axis of the sensor is disposed at a certain angle to the transport direction of the sheet material.

13. An apparatus according to claim 1, wherein at least one second sensor is provided for detecting an intensity of emitted light in the light phase of clocked excitation light and an intensity in the dark phase thereof.

14. An apparatus according to claim 13, wherein the second sensors are constructed analogously to the first sensor.

15. An apparatus according to claim 13, wherein the first sensor detects the intensity of emitted light within, and toward the end (in the transport direction) of, the area of the sheet material illuminated by the illuminating device, and the second sensor the intensity of emitted light within, and toward the beginning (in the transport direction) of, the area illuminated by the illuminating device.

16. An apparatus according to claim 13, wherein the sensors are disposed symmetrically to the illuminating device.

17. An apparatus according to claim 13, wherein the first sensor has at least one filter which transmits only the wave range of fluorescently and phosphorescently emitted light, and the second sensor has at least one filter which transmits only a subrange of the wave range of fluorescently and phosphorescently emitted light.

18. An apparatus according to claim 1, wherein the illuminating device and the sensors are located in a lightproof housing with a transparent window which transmits both the wave range of excitation light and the wave range of fluorescently and phosphorescently emitted light.

19. An apparatus according to claim 18, wherein the transparent window is dereflected at least for light at a certain angle.

20. A method for detecting fluorescently and phosphorescently emitted light from sheet material such as papers of value or bank notes, comprising the following steps:

illuminating the sheet material with clocked excitation light, detecting the light emitted by the sheet material, and transporting the sheet material in a transport direction through the excitation light and the detection area of the light emitted by the sheet material, whereby an intensity of emitted light is detected in the light phase of clocked excitation light and an intensity of emitted light in the dark phase thereof, and an intensity of fluorescently emitted light and an intensity of phosphorescently emitted light are derived from the intensities detected in the light phase and the dark phase of clocked excitation light, wherein the intensity of fluorescently emitted light is derived as the difference of intensity in the light phase and intensity in the dark phase, and the intensity of phosphorescently emitted light corresponds to the intensity in the dark phase.

21. A method according to claim 20, wherein the clock of excitation light is selected as the quotient of the transport speed of the sheet material and a desired resolution.

22. A method according to claim 21, wherein the excitation light has a certain number of light pulses emitted at the beginning of the clock.

23. A method according to claim 22, wherein the intensity is measured in the light phase of a clock during the last light pulse.

24. A method according to claim 22, wherein the intensity is measured in the dark phase of a clock after a constant time period after the last light pulse.

25. A method according to claim 20, wherein the detection area of light emitted by the sheet material is illuminated before detection over several clocks of excitation light by the latter.

26. A method according to claim 20, wherein the light emitted by the sheet material is detected in several different wave ranges.

* * * * *